US012661811B2

(12) United States Patent
Diaz-Lankenau et al.

(10) Patent No.: US 12,661,811 B2
(45) Date of Patent: Jun. 23, 2026

(54) ACCESSORY INTERFACES FOR A MOBILE MANIPULATOR ROBOT

(71) Applicant: Boston Dynamics, Inc., Waltham, MA (US)

(72) Inventors: Guillermo Diaz-Lankenau, Santa Clara, CA (US); Michael Murphy, Carlisle, MA (US)

(73) Assignee: Boston Dynamics, Inc., Waltham, MA (US)

( * ) Notice: Subject to any disclaimer, the term of this patent is extended or adjusted under 35 U.S.C. 154(b) by 643 days.

(21) Appl. No.: 18/070,759

(22) Filed: Nov. 29, 2022

(65) Prior Publication Data

US 2023/0182329 A1 Jun. 15, 2023

Related U.S. Application Data

(60) Provisional application No. 63/288,352, filed on Dec. 10, 2021.

(51) Int. Cl.
| | |
|---|---|
| *B25J 19/06* | (2006.01) |
| *B25J 9/00* | (2006.01) |
| *B25J 19/02* | (2006.01) |

(52) U.S. Cl.
CPC ........... *B25J 19/065* (2013.01); *B25J 9/0009* (2013.01); *B25J 9/0093* (2013.01); *B25J 19/02* (2013.01)

(58) Field of Classification Search
CPC ...................................................... B25J 19/065
See application file for complete search history.

(56) References Cited

U.S. PATENT DOCUMENTS

| | | | | | |
|---|---|---|---|---|---|
| 2,124,835 | A | * | 7/1938 | Strutz | A01D 43/063 |
| | | | | | 24/599.8 |
| 2,417,646 | A | * | 3/1947 | Hallner | B60D 1/155 |
| | | | | | 403/321 |

(Continued)

FOREIGN PATENT DOCUMENTS

| | | |
|---|---|---|
| CN | 107039846 A | 8/2017 |
| CN | 108563209 A | 9/2018 |

(Continued)

OTHER PUBLICATIONS

Andreas Birk. "Autonomous Recharging of Mobile Robots," Draft Version (paper # 97RO029), accepted at ISATA '97, 1997, 8 pages.

(Continued)

*Primary Examiner* — Matthew R McMahon
(74) *Attorney, Agent, or Firm* — Pierce Atwood LLP

(57) ABSTRACT

Consistent connection strategies for coupling accessories to a robot can help achieve certain objectives, e.g., to tolerate and correct misalignment during coupling of the accessory. In some embodiments, the connection strategy may enable certain accessories to connect to certain sides of a robot. When connected, an accessory may be rigid in yaw, lateral motion, and fore/aft motion, while remaining unconstrained in roll and pitch as well as vertical motion. A sensor may enable detection of the accessory, and a mechanical fuse may release the accessory when a force threshold is exceeded. A mechanical coupler of an accessory may include two connectors, each of which includes a receiving area configured to receive a pin on the robot and a latch configured to retain the pin within the receiving area. The pins (and the receiving areas) may be differently sized, and may be differently arranged.

10 Claims, 14 Drawing Sheets

(56) References Cited

U.S. PATENT DOCUMENTS

| | | | |
|---|---|---|---|
| 3,021,658 A * | 2/1962 | Mitchell | A01D 67/005 |
| | | | 56/15.1 |
| 3,830,525 A * | 8/1974 | Ransford, III | H01R 13/62933 |
| | | | 403/2 |
| 3,987,562 A * | 10/1976 | Deen | E01H 5/06 |
| | | | 172/275 |
| 4,789,295 A | 12/1988 | Boucher, Jr. et al. | |
| 5,667,232 A * | 9/1997 | Gogan | B62J 1/28 |
| | | | 280/288.4 |
| 6,022,166 A * | 2/2000 | Rogers, Jr. | B60N 2/01583 |
| | | | 297/336 |
| 6,152,515 A * | 11/2000 | Wieclawski | B60N 2/01583 |
| | | | 296/65.03 |
| 6,588,574 B2 | 7/2003 | Koini et al. | |
| 7,153,085 B2 | 12/2006 | Clark et al. | |
| 7,549,243 B1 * | 6/2009 | Gilles | E02F 3/627 |
| | | | 403/321 |
| 8,070,181 B2 * | 12/2011 | Forrest | B62B 3/02 |
| | | | 280/42 |
| 8,295,980 B2 | 10/2012 | Williamson | |
| 8,965,563 B2 | 2/2015 | Eldershaw et al. | |
| 9,004,846 B2 | 4/2015 | La Rovere et al. | |
| 9,022,160 B2 * | 5/2015 | Smith | B60H 1/00207 |
| | | | 280/756 |
| 9,089,969 B1 | 7/2015 | Theobald | |
| 9,102,053 B2 | 8/2015 | Suzuki | |
| 9,233,470 B1 | 1/2016 | Bradski et al. | |
| 9,434,558 B2 | 9/2016 | Criswell | |
| 9,451,810 B2 | 9/2016 | Regan et al. | |
| 9,481,530 B2 | 11/2016 | Brandmüller et al. | |
| 9,487,361 B2 | 11/2016 | Girtman et al. | |
| 9,493,316 B2 | 11/2016 | Girtman et al. | |
| 9,503,704 B2 | 11/2016 | Ando | |
| 9,519,882 B2 | 12/2016 | Galluzzo et al. | |
| 9,604,363 B2 | 3/2017 | Ban | |
| 9,688,489 B1 | 6/2017 | Zevenbergen et al. | |
| 9,744,669 B2 | 8/2017 | Wicks et al. | |
| 9,875,911 B2 | 1/2018 | Pagaila et al. | |
| 9,919,872 B2 | 3/2018 | Khodl et al. | |
| 9,940,604 B2 | 4/2018 | Galluzzo et al. | |
| 9,969,573 B2 | 5/2018 | Girtman et al. | |
| 9,987,746 B2 | 6/2018 | Bradski et al. | |
| 10,005,627 B2 | 6/2018 | Girtman et al. | |
| 10,071,856 B2 | 9/2018 | Hance et al. | |
| 10,108,185 B1 | 10/2018 | Theobald | |
| 10,122,995 B2 | 11/2018 | Rublee et al. | |
| 10,124,489 B2 | 11/2018 | Chitta et al. | |
| 10,124,967 B2 | 11/2018 | Girtman et al. | |
| 10,147,069 B2 | 12/2018 | Galluzzo et al. | |
| 10,216,865 B1 | 2/2019 | Theobald | |
| 10,239,210 B2 | 3/2019 | Morency et al. | |
| 10,343,857 B2 | 7/2019 | Morency et al. | |
| 10,417,521 B2 | 9/2019 | Dong | |
| 10,518,973 B2 | 12/2019 | Hance et al. | |
| 10,661,444 B2 | 5/2020 | Mccollum et al. | |
| 10,766,149 B2 | 9/2020 | Marchese et al. | |
| 10,793,047 B1 | 10/2020 | Theobald | |
| 10,856,948 B2 * | 12/2020 | Cagle | A61B 34/30 |
| 11,897,126 B2 * | 2/2024 | Ejstrup Hansen | B66F 9/063 |
| 12,415,285 B2 | 9/2025 | Meduna et al. | |
| 2006/0182607 A1 | 8/2006 | Clark et al. | |
| 2013/0017053 A1 | 1/2013 | Forget et al. | |
| 2014/0079524 A1 | 3/2014 | Shimono | |
| 2015/0066199 A1 | 3/2015 | Shimono | |
| 2016/0221187 A1 | 8/2016 | Bradski et al. | |
| 2017/0072558 A1 | 3/2017 | Reynolds et al. | |
| 2018/0222695 A9 | 8/2018 | Girtman et al. | |
| 2018/0370377 A1 | 12/2018 | Blacksberg et al. | |
| 2019/0155296 A1 | 5/2019 | Moore et al. | |
| 2019/0242916 A1 | 8/2019 | Guarracina et al. | |
| 2019/0381617 A1 | 12/2019 | Patrini et al. | |
| 2020/0254607 A1 | 8/2020 | Hansen et al. | |
| 2021/0101748 A1 | 4/2021 | Helsel et al. | |
| 2021/0221612 A1 | 7/2021 | Rogers et al. | |
| 2022/0063085 A1 | 3/2022 | Chintamani et al. | |
| 2024/0093650 A1 | 3/2024 | Bagnariol et al. | |

FOREIGN PATENT DOCUMENTS

| | | |
|---|---|---|
| CN | 112572638 A | 3/2021 |
| DE | 10335568 A1 | 2/2005 |
| EP | 2347069 B1 | 3/2018 |
| EP | 3646993 A1 | 5/2020 |
| JP | 2008229738 A | 10/2008 |
| WO | 1998051598 A1 | 11/1998 |
| WO | 2010034044 A2 | 4/2010 |
| WO | 2014041318 A1 | 3/2014 |
| WO | 2014111633 A1 | 7/2014 |
| WO | 2014113762 A1 | 7/2014 |
| WO | 2014186781 A1 | 11/2014 |
| WO | 2015017444 A1 | 2/2015 |
| WO | 2015035300 A1 | 3/2015 |
| WO | 2015187975 A1 | 12/2015 |
| WO | 2016014917 A1 | 1/2016 |
| WO | 2016033172 A1 | 3/2016 |
| WO | 2017136429 A1 | 8/2017 |
| WO | 2017146895 A1 | 8/2017 |
| WO | 2018022265 A1 | 2/2018 |

OTHER PUBLICATIONS

Silverman, et al. "Staying Alive: A Docking Station for Autonomous Robot Recharging," Proceedings 2002 IEEE International Conference on Robotics and Automation (Cat. No. 02CH37292), May 2002, vol. 1, pp. 1050-1055. IEEE.

Angelica Munoz, et al. "Sharing a Charging Station in Collective Robotics," [Technical Report], 2003, 9 pages, https://www-ftp.lip6.fr/lip6/reports/2002/lip6.2002.026.pdf.

Riccardo Cassinis, et al. "Docking and Charging System for Autonomous Mobile Robots," https://www.researchgate.net/publication/228800043, Jan. 4, 2020, 7 pages.

Fan Guangrui and Wang Geng. "Vision-Based Autonomous Docking and Re-charging System for Mobile Robot in Warehouse Environment," 2017 2nd International Conference on Robotics and Automation Engineerings (ICRAE), Dec. 2017, 5 pages.

Carlos Antonio Acosta Calderon, et al. "Development of a hospital mobile platform for logistics tasks," Digital Communications and Networks, vol. 1, Issue 32, Apr. 2015, pp. 102-111. Retrieved from https://www.sciencedirect.com/science/article/pii/S2352864815000085.

Tanmoy Kundu, et al. "Charging Station Placement for Indoor Robotic Applications," IEEE International Conference on Robotics and Automation, (ICRA 2018), https://www.cse.iitk.ac.in/users/isaha/Publications/Conferences/ICRA18.pdf/, 9 pages.

SwarmRobot.org. "Docking station for auto recharging." Swarmrobot / Open-Source micro-robotic project. The Wayback Machine, https://web.archive.org/web/20211202224108/http://www.swarmrobot.org/PowerDockingStation.html, Dec. 2, 2021, 4 pages.

Roberto Quilez, et al. "Docking autonomous robots in passive docks with Infrared sensors and QR codes," International Conference on Testbeds and Research Infrastructures for the Development of Networks & Communities (TridentCOM), Jun. 2015, (HAL Id: hal-01147332), 10 pages. https://hal.inria.fr/hal-01147332/document.

Hans Schourup A/S. "Fetch Robotics FAQ, Installation and mapping of areas." Retrieved Feb. 6, 2024 from https://www.hans-schourup.dk/en/fetch-robotics/faq/, 6 pages.

International Preliminary Report on Patentability and Written Opinion from the International Bureau for Application No. PCT/US2022/051176, dated Jun. 20, 2024, 10 pages.

International Search Report and Written Opinion of the International Searching Authority for International Application No. PCT/US2022/051176, dated Mar. 16, 2023.

(56) References Cited

OTHER PUBLICATIONS

International Preliminary Report on Patentability for International Application No. PCT/US2022/021142 dated Sep. 12, 2023; 11 pages.

* cited by examiner

ACCESSORY INTERFACES FOR A MOBILE MANIPULATOR ROBOT

CROSS REFERENCE TO RELATED APPLICATIONS

This application claims the benefit under 35 U.S.C. § 119(e) of U.S. Provisional application Ser. No. 63/288,352, filed Dec. 10, 2021, and entitled, "ACCESSORY INTERFACES FOR A MOBILE MANIPULATOR ROBOT," the disclosure of which is incorporated by reference in its entirety.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

Consistent connection strategies for coupling accessories to a robot can help achieve certain objectives, e.g., to tolerate and correct misalignment during coupling of the accessory, and/or enable manual coupling without tools or loose parts. In some embodiments, the connection strategy may enable certain accessories to connect to certain sides of a robot. When connected, an accessory may be rigid in yaw, lateral motion, and fore/aft motion, while remaining unconstrained in roll and pitch as well as vertical motion. A sensor may enable detection of the accessory, and a mechanical fuse may release the accessory when a force threshold is exceeded. In some embodiments, a mechanical coupler of an accessory may include two connectors, each of which includes a receiving area configured to receive a pin on the robot and a latch configured to retain the pin within the receiving area. The pins (and the receiving areas) may be differently sized, and may be differently arranged in different mechanical couplers to ensure that accessories only connect to the desired side of a robot.

One aspect of the disclosure provides a mechanical coupler for coupling a robot and an accessory. The mechanical coupler comprises a first connector and a second connector. The first connector comprises a first receiving area and a first moveable latch. The first receiving area is configured to receive a first pin of the robot through a first opening, the first pin including a first diameter. The first moveable latch is configured to constrain motion of the first pin when the first pin is received within the first receiving area and when a first protrusion of the first moveable latch is disposed in the first opening. The second connector comprises a second receiving area and a second moveable latch. The second receiving area is configured to receive a second pin of the robot through a second opening, the second pin including a second diameter smaller than the first diameter. The second moveable latch is configured to constrain motion of the second pin when the second pin is received within the second receiving area and when a second protrusion of the second moveable latch is disposed in the second opening.

The mechanical coupler is configured to constrain rotation between the accessory and the robot about a first axis and to constrain translation between the accessory and the robot along second and third axes, wherein the second and third axes are each perpendicular to the first axis, and wherein the third axis is perpendicular to the second axis.

In another aspect, the first receiving area includes a round hole and the second receiving area includes a linear slot.

In another aspect, the mechanical coupler is configured to enable translation between the accessory and the robot along the first axis and is configured to enable rotation between the accessory and the robot about the second and third axes.

In another aspect, the mechanical coupler is configured to enable rotation between the accessory and the robot about the second axis of greater than or equal to −15 degrees and less than or equal to 15 degrees, and the mechanical coupler is configured to enable rotation between the accessory and the robot about the third axis of greater than or equal to −15 degrees and less than or equal to 15 degrees.

In another aspect, the mechanical coupler is configured to enable rotation between the accessory and the robot about the second axis of greater than or equal to −10 degrees and less than or equal to 10 degrees, and the mechanical coupler is configured to enable rotation between the accessory and the robot about the third axis of greater than or equal to −10 degrees and less than or equal to 10 degrees.

In another aspect, the mechanical coupler further comprises a first torsional spring configured to rotate the first moveable latch relative to the first receiving area in a first direction; and a second torsional spring configured to rotate the second moveable latch relative to the second receiving area in a second direction.

In another aspect, the first moveable latch includes a first handle configured to enable rotation of the first moveable latch in a third direction opposite the first direction; and the second moveable latch includes a second handle configured to enable rotation of the second moveable latch in a fourth direction opposite the second direction.

In another aspect, the mechanical coupler further comprises a detectable component configured to be detected when the robot and the accessory are coupled.

In another aspect, the detectable component includes a magnet configured to be detected by a magnetic sensor on the robot.

In another aspect, the first connector includes at least one mechanical fuse.

In another aspect, the at least one mechanical fuse includes a flexure.

In another aspect, the at least one mechanical fuse includes a break-off pin.

In another aspect, the at least one mechanical fuse includes a first mechanical fuse and a second mechanical fuse, the first mechanical fuse includes a flexure configured to enable motion of the first moveable latch to release the first pin at a first load, and the second mechanical fuse includes a break-off pin configured to break at a second load greater than the first load.

In another aspect, a cart accessory comprises a cart body having a flat surface on which one or more objects can be placed; a plurality of wheels coupled to the cart body; and a mechanical coupler.

In another aspect, a conveyor accessory comprises a plurality of rollers on which one or more objects can be placed; one or more legs coupled to the plurality of rollers; and a mechanical coupler.

In another aspect, a conveyor accessory comprises one or more belts on which one or more objects can be placed; one or more legs coupled to the one or more belts; and a mechanical coupler.

One aspect of the disclosure provides a robot. The robot comprises a mobile base and a first mechanical coupler on a first side of the mobile base. The first mechanical coupler comprises a first sensor configured to detect a first accessory coupled to the first mechanical coupler. The robot further comprises a second mechanical coupler on a second side of the mobile base opposite the first side. The second mechanical coupler comprises a second sensor configured to detect a second accessory coupled to the second mechanical coupler. The first mechanical coupler is compatible with the first accessory and is incompatible with the second accessory. The second mechanical coupler is compatible with the second accessory and is incompatible with the first accessory.

In another aspect, the robot further comprises a robotic arm operatively coupled to the mobile base.

In another aspect, the robot is in combination with the first accessory, wherein the first accessory is a cart.

In another aspect, the robot is in combination with the second accessory, wherein the second accessory is a conveyor.

In another aspect, the first mechanical coupler comprises a first pin including a first diameter and a second pin including a second diameter. The second diameter is smaller than the first diameter. The second mechanical coupler comprises a third pin including a third diameter and a fourth pin including a fourth diameter. The fourth diameter is smaller than the third diameter. A first distance between the first pin and a third side of the mobile base is less than a second distance between the second pin and the third side, and a third distance between the third pin and the third side is less than a fourth distance between the fourth pin and the third side.

In another aspect, the first mechanical coupler is configured to constrain rotation between the first accessory and the robot about a first axis and is configured to constrain translation between the first accessory and the robot along second and third axes, wherein the second and third axes are each perpendicular to the first axis, and wherein the third axis is perpendicular to the second axis. The second mechanical coupler is configured to constrain rotation between the second accessory and the robot about a fourth axis and is configured to constrain translation between the second accessory and the robot along fifth and sixth axes, wherein the fifth and sixth axes are each perpendicular to the fourth axis, and wherein the sixth axis is perpendicular to the fifth axis.

In another aspect, the first sensor includes a first magnetic sensor configured to detect a first magnet on the first accessory, and the second sensor includes a second magnetic sensor configured to detect a second magnet on the second accessory.

One aspect of the disclosure provides a kit. The kit comprises an adjustable brace configured to couple to an expandable accessory and constrain expansion of at least a portion of the expandable accessory in a length direction of the expandable accessory, and a mechanical coupler coupled to the adjustable brace.

In another aspect, the expandable accessory comprises a conveyor accessory including a plurality of rollers and a plurality of legs coupled to the plurality of rollers, and the adjustable brace is configured to couple between adjacent legs of the plurality of legs to fix a distance between the adjacent legs.

In another aspect, the kit further comprises a radio-frequency (RF) identifier tag arranged thereon.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
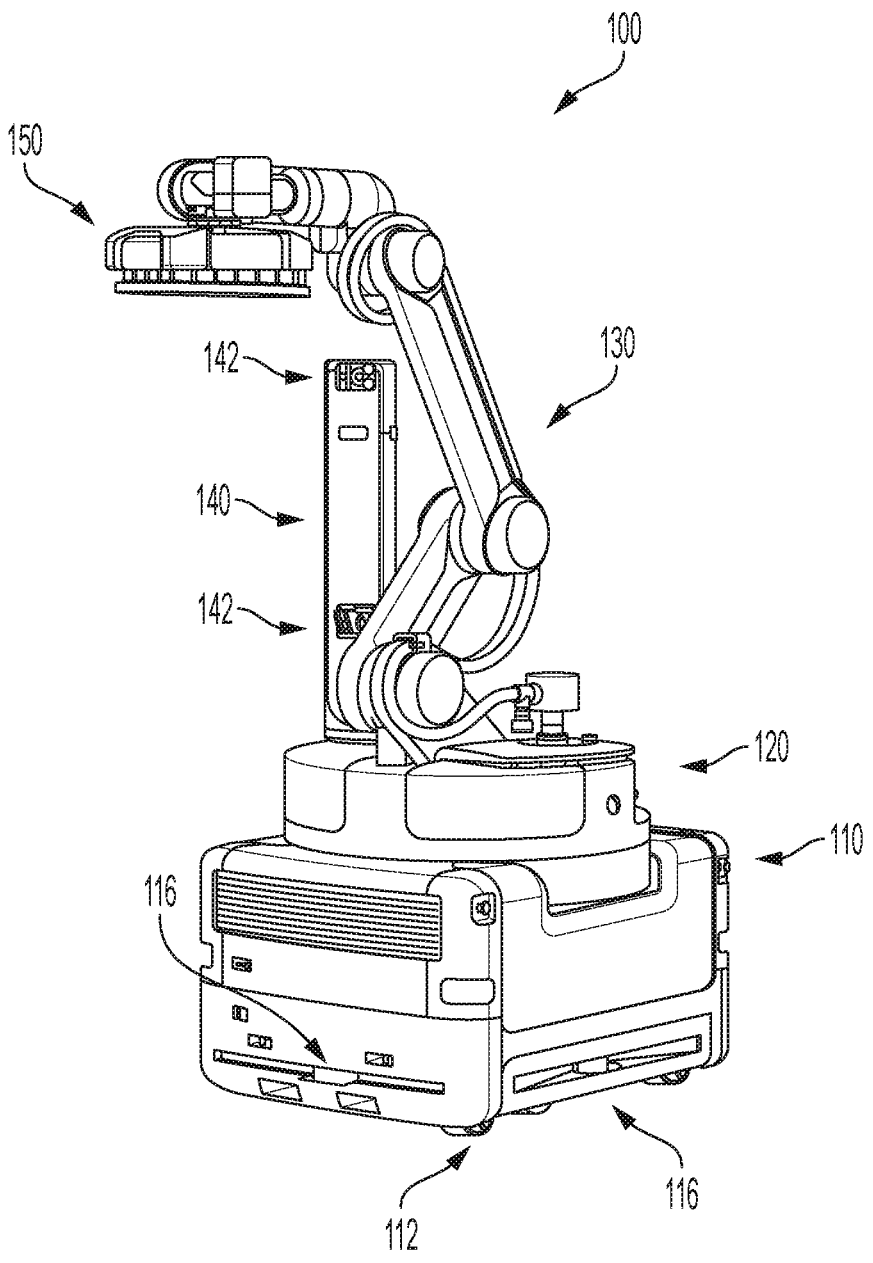
FIG. 1A is a perspective view of one embodiment of a robot.

Robots are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialist robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialist robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not a pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
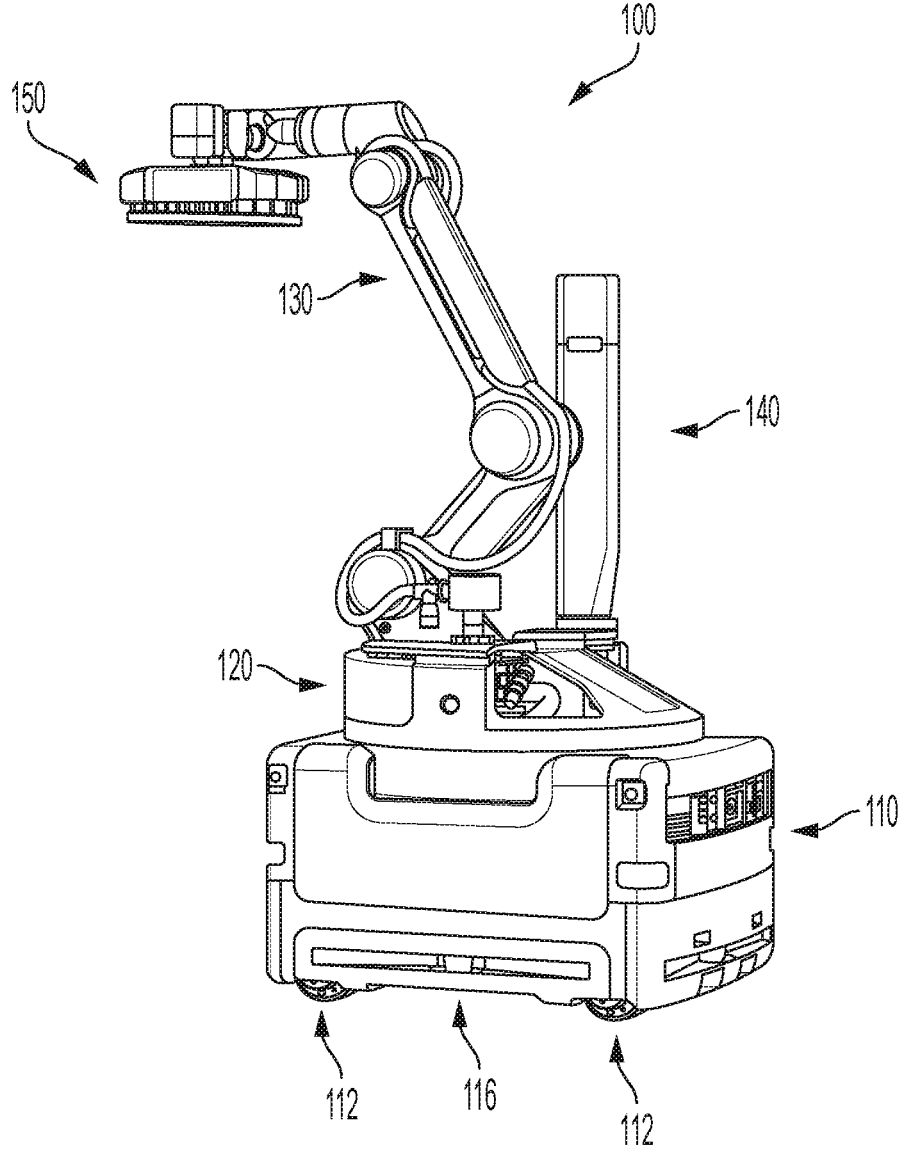
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
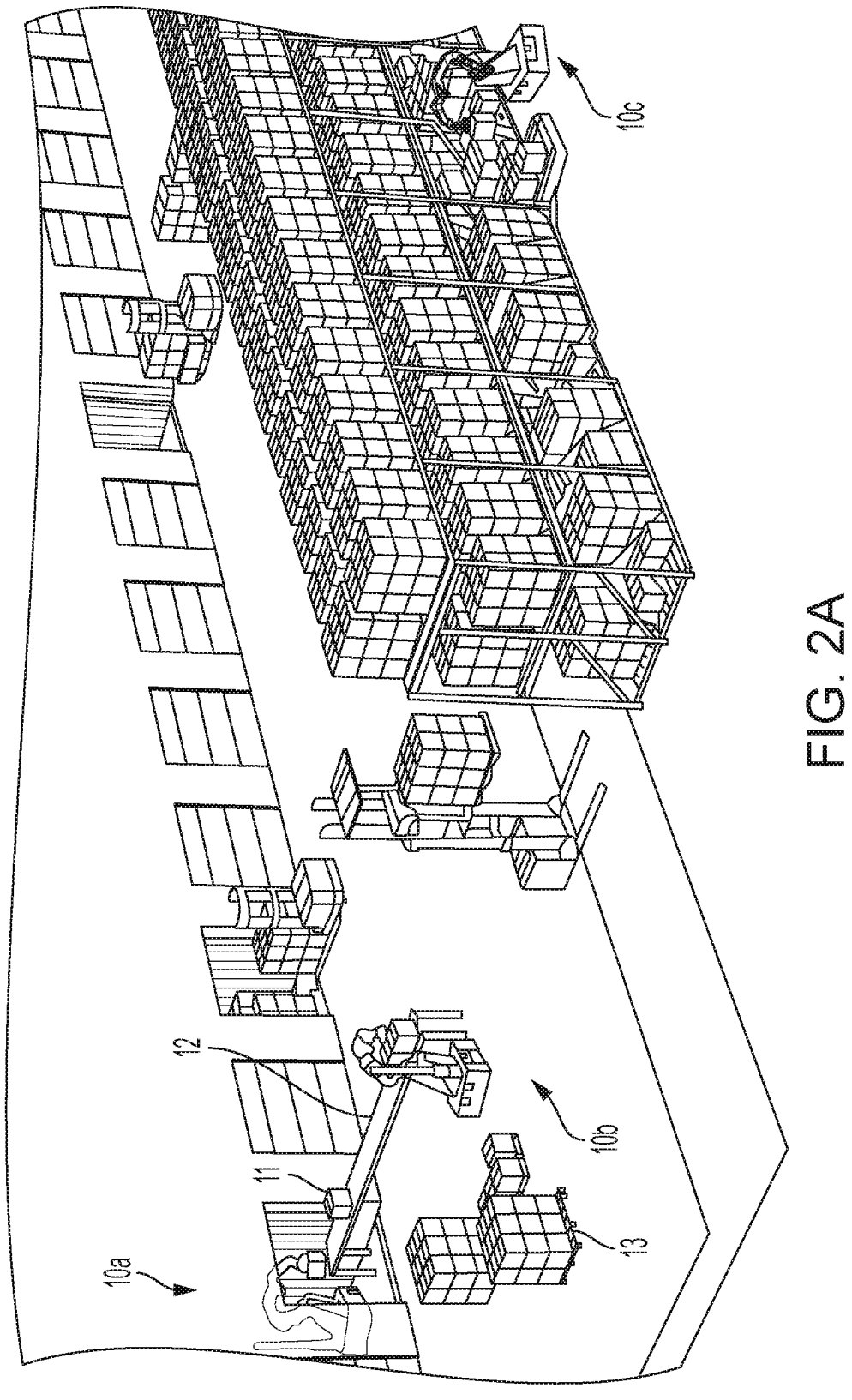
FIG. 2A depicts robots performing tasks in a warehouse environment.

FIG. 2A depicts robots 10*a*, 10*b*, and 10*c* performing different tasks within a warehouse environment. A first robot 10*a* is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10*b* organizes the boxes 11 onto a pallet 13. In a separate area of the warehouse, a third robot 10*c* picks boxes from shelving to build an order on a pallet (this particular task will be discussed in greater detail below in reference to FIG. 2C). It should be appreciated that the robots 10*a*, 10*b*, and 10*c* are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 2B:
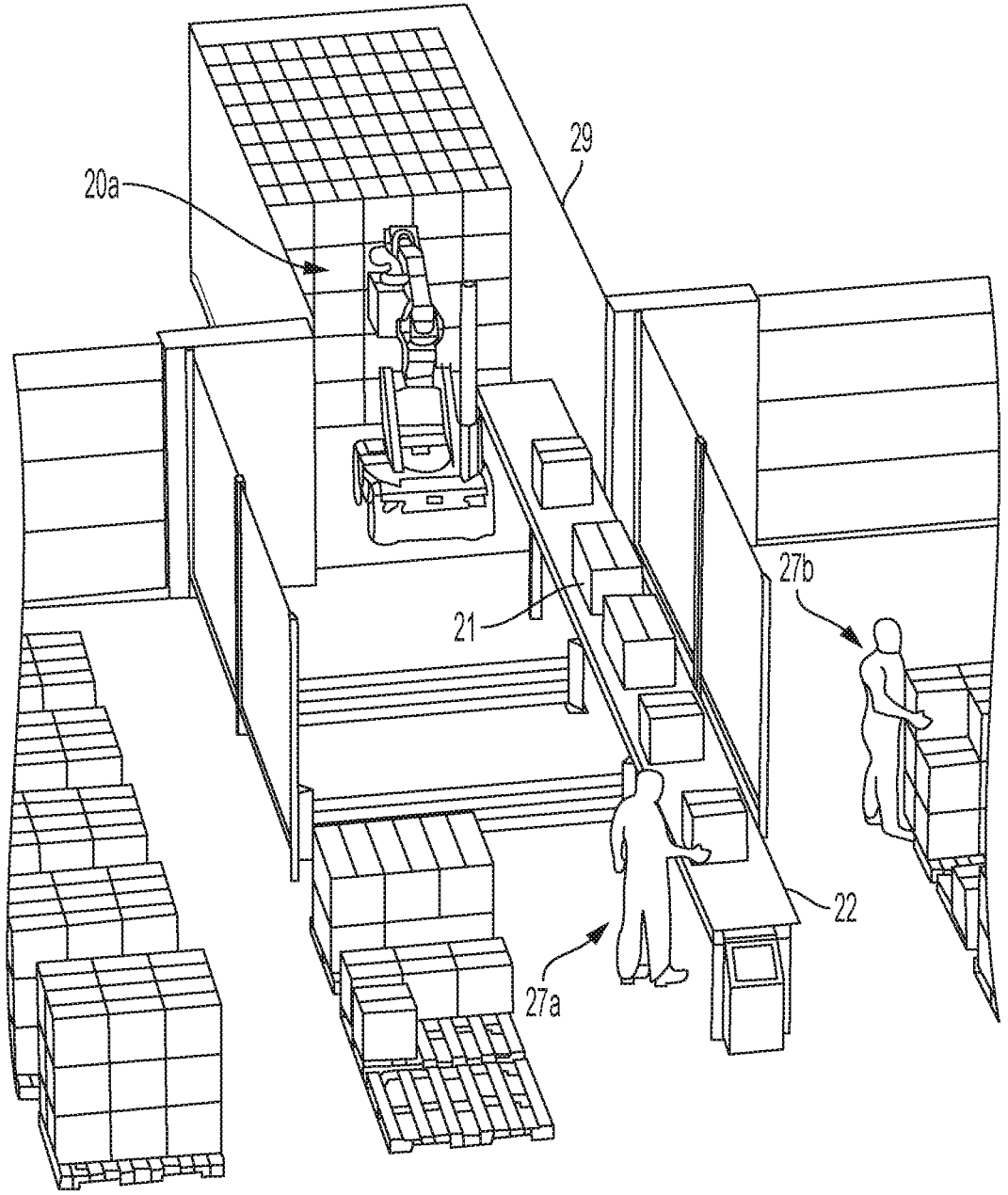
FIG. 2B depicts a robot unloading boxes from a truck.

FIG. 2B depicts a robot 20*a* unloading boxes 21 from a truck 29 and placing them on a conveyor belt 22. In this box picking application (as well as in other box picking applications), the robot 20*a* will repetitiously pick a box, rotate, place the box, and rotate back to pick the next box. Although robot 20*a* of FIG. 2B is a different embodiment from robot 100 of FIGS. 1A and 1B, referring to the components of robot 100 identified in FIGS. 1A and 1B will ease explanation of the operation of the robot 20*a* in FIG. 2B. During operation, the perception mast of robot 20*a* (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20*a* to plan its next movement while simultaneously executing a current movement. For example, while the robot 20*a* is picking a first box from the stack of boxes in the truck 29, the perception modules on the perception mast may point at and gather information about the location where the first box is to be placed (e.g., the conveyor belt 22). Then, after the turntable rotates and while the robot 20*a* is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20*a* may parallelize tasks which may otherwise have been performed sequentially, thus enabling faster and more efficient operation.

Also of note in FIG. 2B is that the robot 20*a* is working alongside humans (e.g., workers 27*a* and 27*b*). Given that the robot 20*a* is configured to perform many tasks that have traditionally been performed by humans, the robot 20*a* is designed to have a small footprint, both to enable access to areas designed to be accessed by humans, and to minimize the size of a safety zone around the robot into which humans are prevented from entering.

Figure 2C:
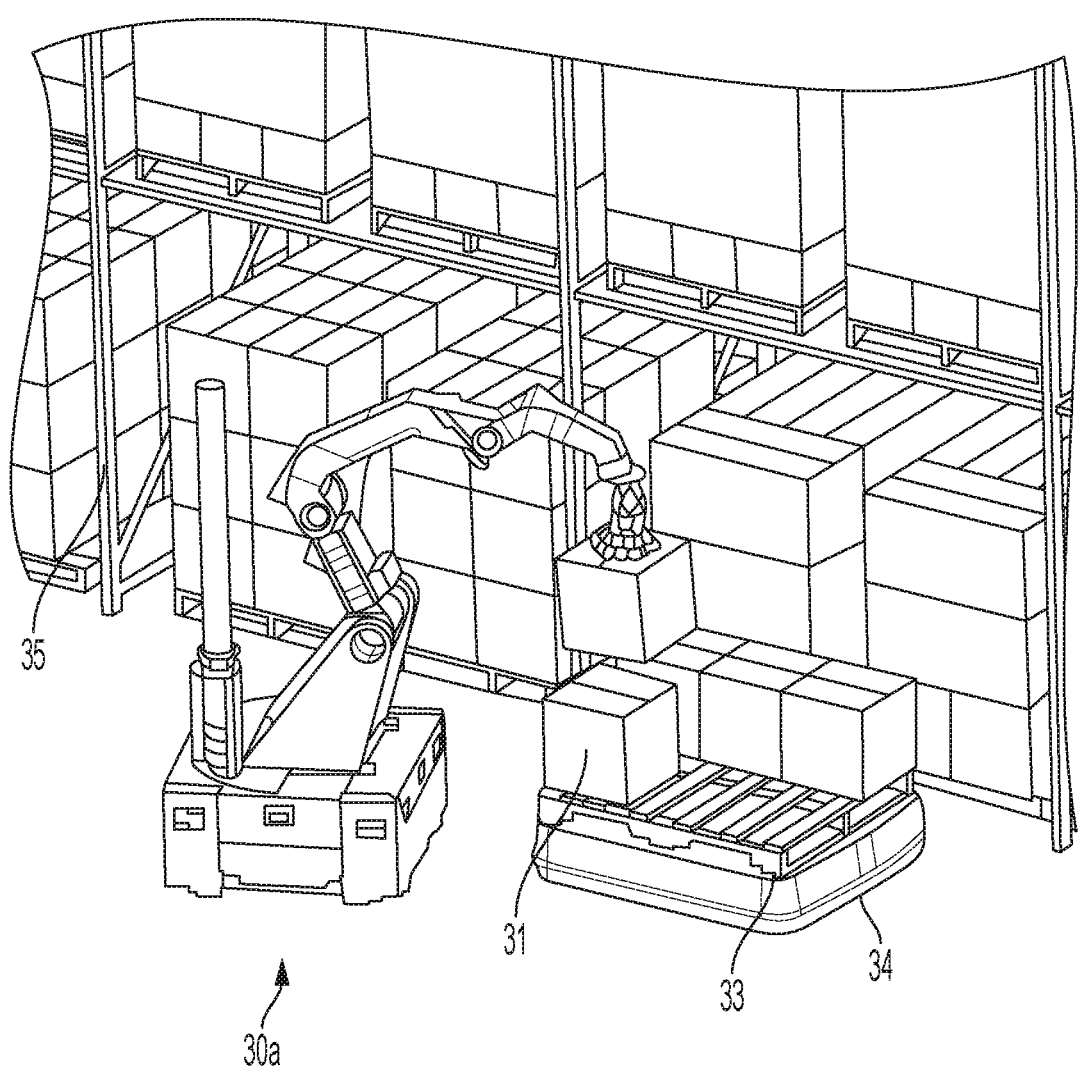
FIG. 2C depicts a robot building a pallet in a warehouse aisle.

FIG. 2C depicts a robot 30*a* performing an order building task, in which the robot 30*a* places boxes 31 onto a pallet 33. In FIG. 2C, the pallet 33 is disposed on top of an autonomous mobile robot (AMR) 34, but it should be appreciated that the capabilities of the robot 30*a* described in this example apply to building pallets not associated with an AMR. In this task, the robot 30*a* picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 2A-2C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

Example Accessory Interfaces

As described above, a highly integrated mobile manipulator robot includes a mobile base and a robotic arm. The mobile base is configured to move the robot to different locations to enable interactions between the robotic arm and different objects of interest. In some embodiments, the mobile base may include an accessory interface configured to enable selective coupling to different accessories. As briefly noted above, accessories may include accessories that facilitate performance of object manipulation tasks by the robot. For example, a cart accessory may be attached to the mobile base through an accessory interface. A cart accessory may be passive (e.g., may be pulled by the robot as the mobile base moves the robot), or may be active (e.g., may have some powered and/or active components, such as steerable and/or drivable wheels). The cart accessory may include a flat surface, which may be used to support a pallet onto which the robot may place boxes or other objects, such as in an order building task as described above in relation to FIG. 2C. That is, although an AMR 34 is shown supporting the pallet 33 in FIG. 2C, a cart accessory (such as cart accessory 390 discussed below in relation to FIG. 3B) may be used to support a pallet in an order building task. As another example of an accessory configured to facilitate performance of an object manipulation task, the robot may be configured to couple to a conveyor through an accessory interface. Coupling to a fixed conveyor (e.g., a conveyor that is constrained to remain in place) may be advantageous in anchoring the robot as the robot loads boxes or other objects onto the conveyor, while coupling to a free conveyor (e.g., a conveyor that is unconstrained and free to move) may be advantageous in enabling the robot to move and/or reorient the conveyor as the robot performs a task.

Throughout the present disclosure, reference may be made primarily to a few specific accessories, for consistency and ease of description. However, it should be understood that a mobile manipulator robot with one or more accessory interfaces may be configured to couple to any suitable number of different accessories, and that the present disclosure is not limited to the types of accessories specifically described here.

Figure 3A:
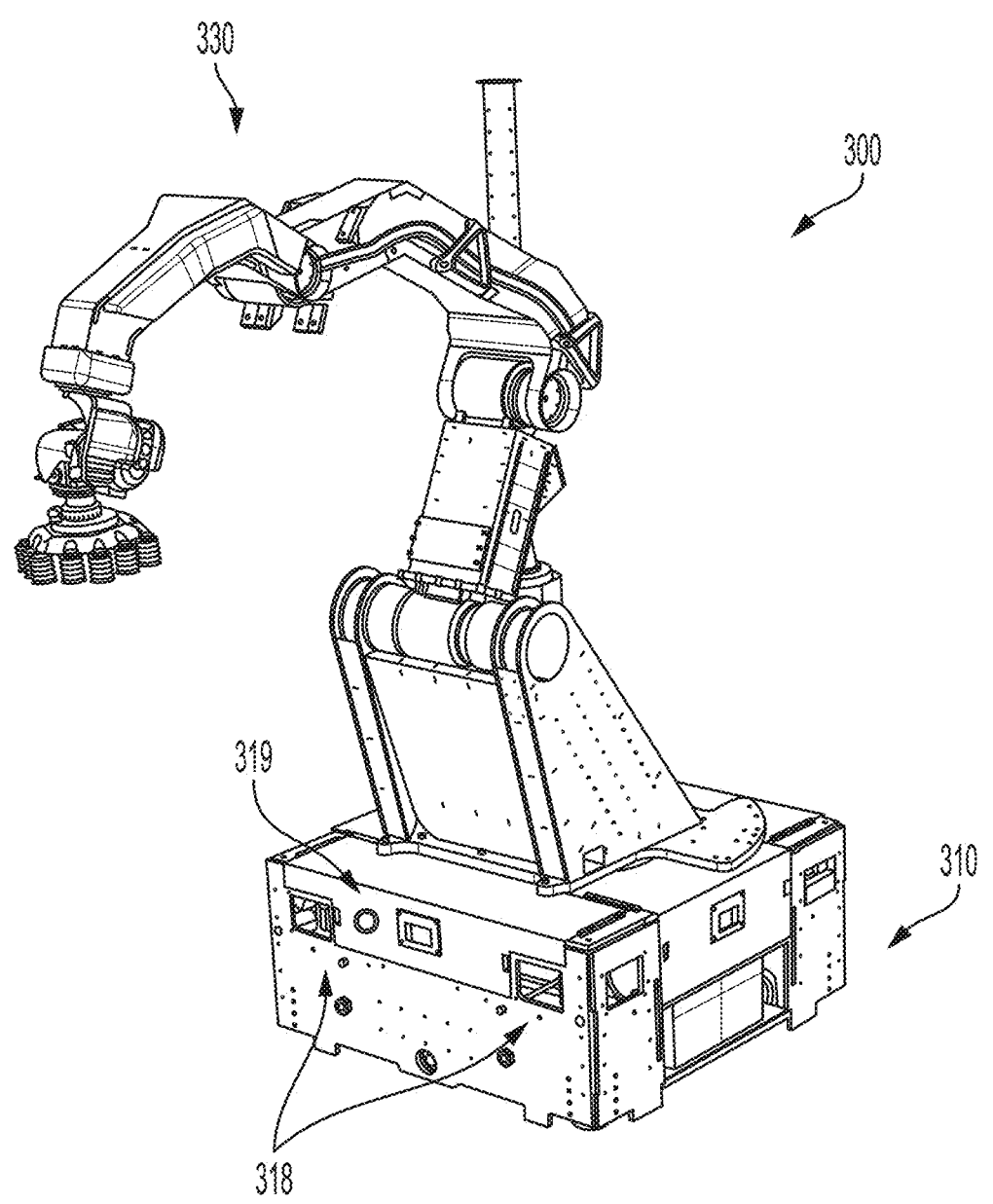
FIG. 3A depicts one embodiment of a mechanical coupler of a robot.

One embodiment of an accessory interface is depicted in FIG. 3A. In FIG. 3A, a mobile manipulator robot 300 that includes a mobile base 310 and a robotic arm 330 includes both a mechanical interface 318 and an electrical interface 319. The mechanical interface 318 may be configured to enable physical coupling between the robot and an accessory. For instance, the mechanical interface may be configured to transmit one or more forces and/or torques between the robot and the accessory. As a particular example, when a cart accessory is coupled to the robot through a mechanical interface, the mechanical interface may be configured to sustain sufficient loads to enable the mobile base of the robot to move (e.g., push or pull) the cart accessory. The electrical interface 319 may be configured to transmit power and/or data between the robot and the accessory. As used herein, the term "accessory interface" may refer to a mechanical interface of a robot, an electrical interface of a robot, both a mechanical interface and an electrical interface of a robot collectively, or any other interface of a robot configured to enable coupling to and/or coordination with one or more accessories. It should be appreciated that some accessories may be configured to couple to a robot using only a mechanical interface, some accessories may be configured to couple to a robot using only an electrical interface, and some accessories may be configured to couple to a robot using both a mechanical interface and an electrical interface. Furthermore, it should be appreciated that some interfaces (whether mechanical, electrical, or other) may be specific to certain accessories (e.g., to a specific accessory or to a specific type of accessory), while other interfaces may be universal and configured to accept many different accessories. Although the examples described herein show a mechanical interface and an electrical interface being distinct interfaces formed on the robot, it should be appreciated that in some embodiments, an accessory interface includes an integrated interface that includes both mechanical and electrical interfaces. The details of accessory interfaces designed in accordance with some embodiments are elucidated in the examples below.

Figure 3B:
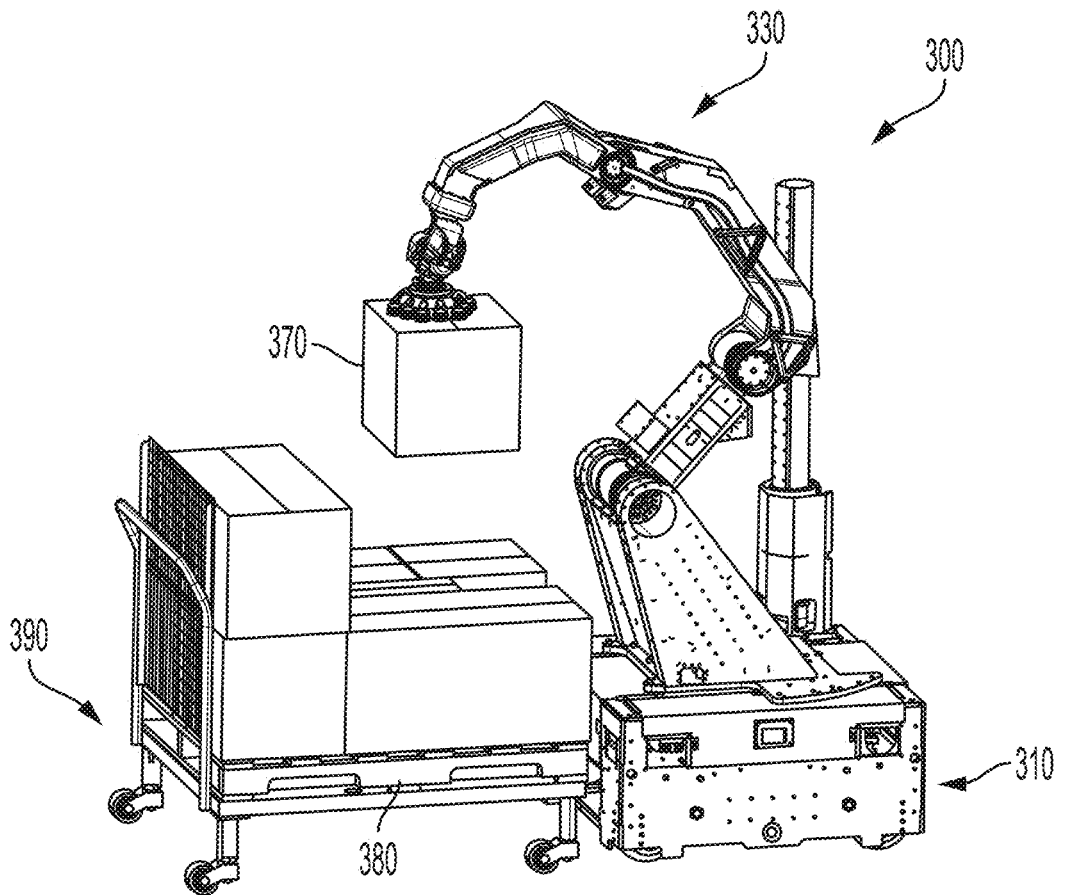
FIG. 3B depicts a robot coupled to a cart accessory through the mechanical coupler of FIG. 3A.

As previously stated, one example of an accessory is a cart accessory. Referring to FIG. 3B, the mobile manipulator robot 300 may be configured to couple to a cart accessory 390 through an accessory interface. The cart accessory 390 may be configured to support a pallet 380 on which boxes 370 or other objects can be placed. Just as the robot 300 is configured to couple to the cart accessory through an accessory interface, the cart accessory 390 (or any other accessory) may be configured to couple to the robot through a robot interface. That is, an accessory interface of a robot (which may include a mechanical interface and/or an electrical interface, as described above in relation to FIG. 3A) may be configured to couple to a robot interface of an accessory. In the embodiment of FIG. 3B, the cart accessory 390 is passive, such that the cart accessory couples to the robot 300 through a mechanical interface 318, as will be described in greater detail below in reference to FIGS. 4A-4F. However, it should be appreciated that a cart accessory may, in some embodiments, include one or more powered components, such that the cart accessory may couple to a robot through both a mechanical interface and an electrical interface, wherein the electrical interface may be configured to provide power from the robot to the one or more powered components of the coupled cart accessory.

Figure 4A:
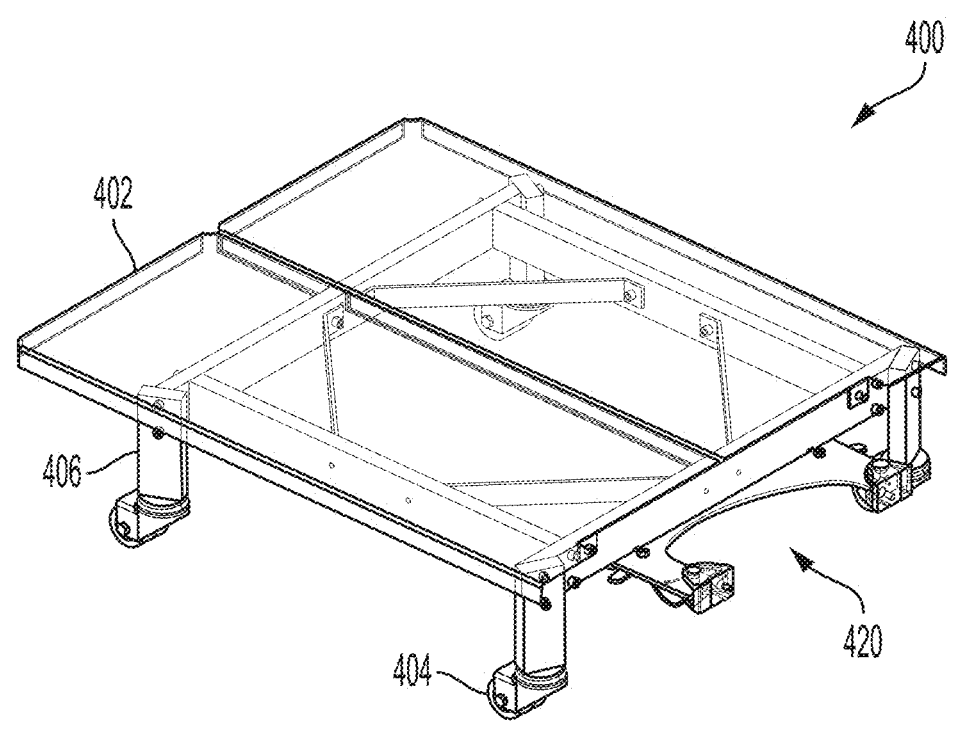
FIG. 4A is a perspective view of one embodiment of a cart accessory for a robot.
Figure 4B:
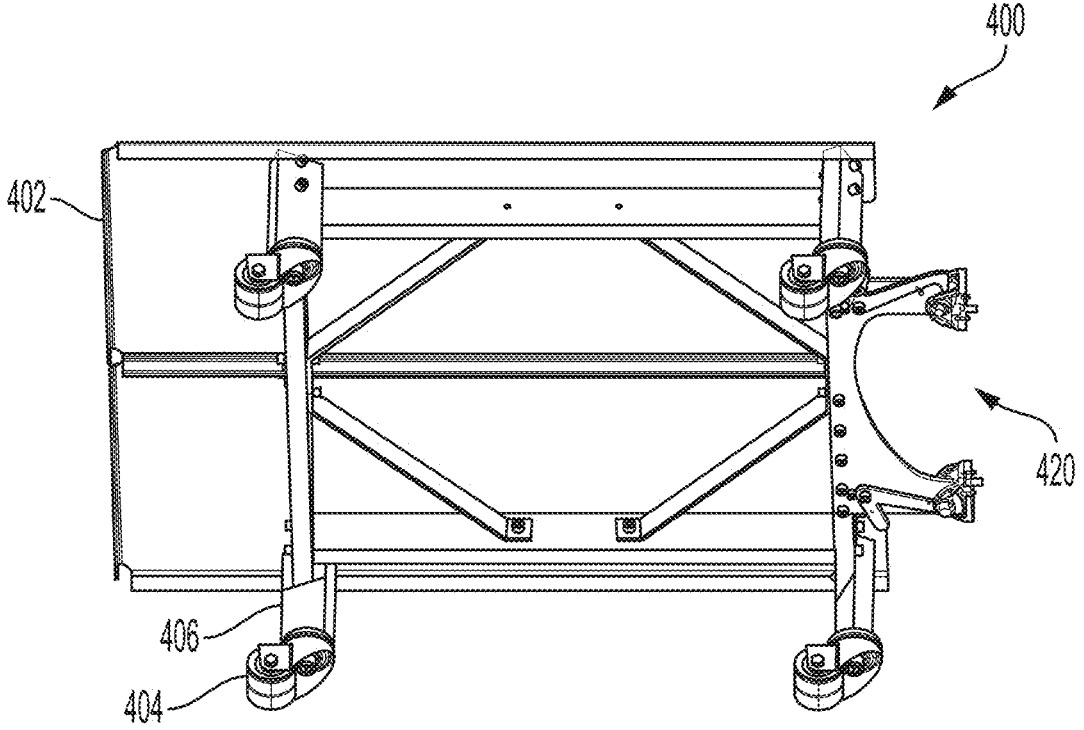
FIG. 4B is another perspective view of the cart accessory of FIG. 4A.

FIGS. 4A and 4B depict one embodiment of a cart accessory 400. The cart accessory 400 includes a cart body having a flat surface 402 on which one or more objects (e.g., boxes) can be placed. The cart accessory 400 also includes multiple wheels 404 which are coupled to the cart body by legs 406. The cart accessory 400 additionally includes a robot interface 420 configured to mate with an accessory interface of a robot, as described below in reference to FIGS. 4C and 4D. It should be appreciated that, as used herein, the terms "robot interface" and "accessory interface" may generally refer to mechanical and/or electrical interfaces of an accessory and a robot, respectively. In the below description of FIGS. 4C-4F, the robot interface 420 may alternatively be referred to as a mechanical coupler 420, as the robot interface in this embodiment includes only a mechanical interface. Similarly, an accessory interface of a robot may alternatively be referred to as a mechanical coupler when it includes only a mechanical interface.

Figure 4C:
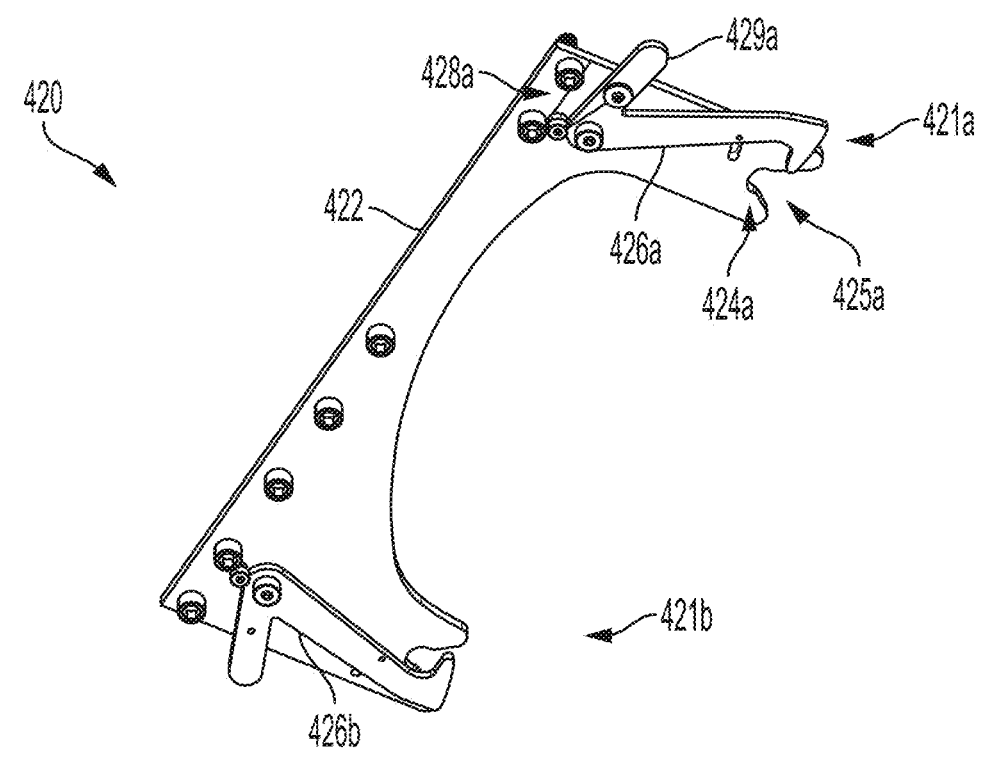
FIG. 4C is a bottom perspective view of one embodiment of a mechanical coupler of an accessory.
Figure 4D:
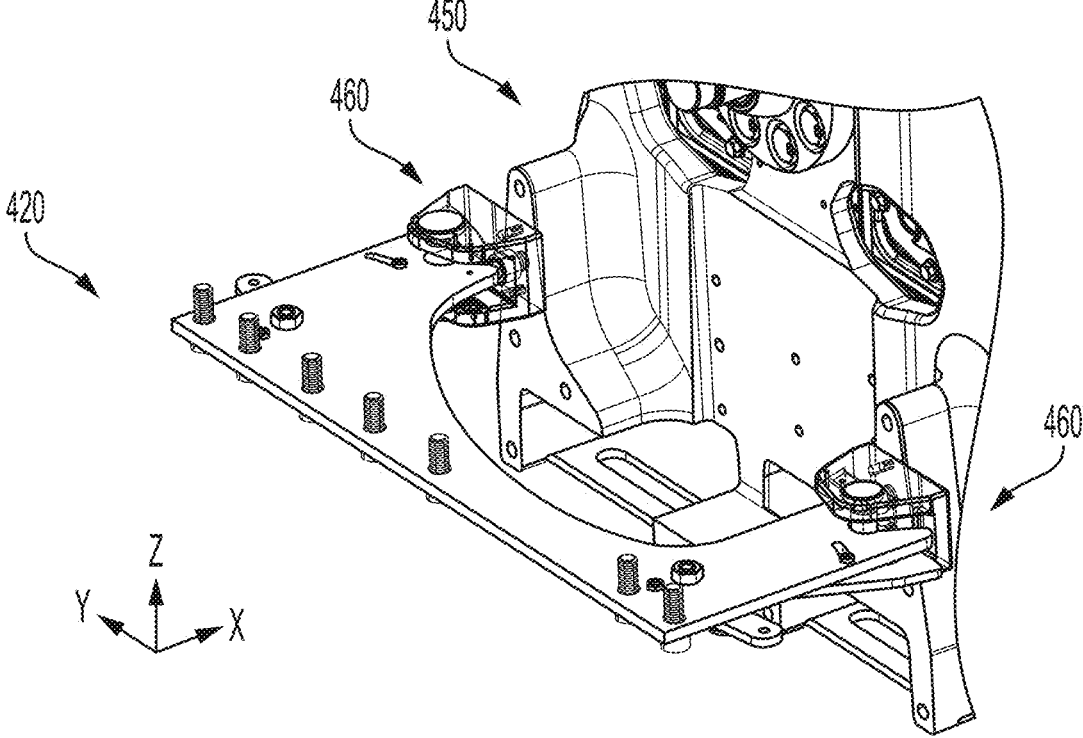
FIG. 4D is a top perspective view of the mechanical coupler of FIG. 4C coupled to an accessory interface of a robot.

One embodiment of a mechanical coupler 420 configured to couple an accessory to an accessory interface of a robot is shown in isolation in FIG. 4C. FIG. 4D shows the mechanical coupler 420 of FIG. 4C coupled to a mechanical coupler 460 of a robot 450. It should be appreciated that although the mechanical coupler 420 is shown as a portion of a cart accessory 400 in FIGS. 4A and 4B, a mechanical coupler 420 may be used with any suitable accessory, and need not be limited to a cart accessory. For instance, mechanical coupler 420 may alternatively be used to couple a conveyor accessory to a robot.

Referring first to FIG. 4C, the mechanical coupler 420 includes a main body 422 and two connectors 421a and 421b. Each connector includes a receiving area (e.g., receiving area 424a) and a latch (e.g., latch 426a, latch 426b). Each receiving area is configured to receive a mating portion (e.g., a pin) of a mechanical coupler of a robot, as described below in reference to FIG. 4E. Each latch is configured to secure the mating portion of the mechanical coupler of the robot after the mating portion is received in the receiving area through an opening of the receiving area (e.g., opening 425a of receiving area 424a). Each connector additionally includes one or more springs (e.g., torsional spring 428a) configured to bias an associated latch (e.g., latch 426a) toward a closed configuration. A handle on the latch (e.g., handle 429a of latch 426a) may be used to rotate the latch to allow the pin to be removed from the receiving area. For example, a torsional spring may be configured to rotate a latch in a first direction, and a handle may be used to rotate the latch in a second direction opposite the first direction. In some embodiments, a handle may be actuated remotely. For example, a handle may be coupled to a first end of a cable, such that exerting a force on the second end of the cable releases the latch. In some embodiments, a cable may be a Bowden cable.

In some embodiments, the two connectors of a mechanical coupler of an accessory may be differently configured. For example, the two receiving areas may be differently sized to receive differently sized pins of a mechanical coupler of a robot (described in greater detail below). Additionally, the two receiving areas may be differently shaped. For example, a first receiving area may include a round hole, and may be configured to constrain motion of an appropriately sized pin symmetrically in any direction within the first receiving area. A second receiving area may include a linear slot configured to constrain motion of an appropriately sized pin in some directions while enabling motion in other directions (e.g., along the length of the slot). Including differently shaped receiving areas may prevent over-constraining the connection between an accessory and a robot, and may enforce certain design choices. For example, mating a larger pin into a receiving area with a round hole and a smaller pin into a receiving area with a slot may ensure that forces between the accessory and the robot are primarily transferred through the larger pin, which may be able to withstand larger loads.

Turning to FIG. 4D, a mechanical coupler 420 of an accessory (not shown) is coupled to a mechanical coupler 460 of a robot 450. When the robot 450 and the accessory are coupled through the respective mechanical couplers 420 and 460, certain degrees of freedom of translation and/or rotation between the accessory and the robot may be constrained. In reference to FIG. 4D, a direction parallel to the X-axis may be referred to as a fore/aft direction, a direction parallel to the Y-axis may be referred to as a lateral direction, and a direction parallel to the Z-axis may be referred to as a vertical direction. Rotation about an axis parallel to the X-axis may be referred to as roll, rotation about an axis parallel to the Y-axis may be referred to as pitch, and rotation about an axis parallel to the Z-axis may be referred to as yaw. When the accessory and the robot are coupled, relative translation between the accessory and the robot in both a fore/aft direction and a lateral direction may be constrained, while relative translation in a vertical direction may be unconstrained. When the accessory and the robot are coupled, relative rotation between the accessory and the robot about a yaw axis may be constrained, while relative rotation about pitch and roll axes may be unconstrained.

The combination of constraints described above may provide numerous benefits. For example, by enabling the accessory to pitch relative to the robot, the robot may be able to navigate inclines and declines with the accessory attached. Such capability may be particularly beneficial in logistics applications, in which a robot with an attached accessory may traverse ramps within a warehouse or into a truck. In some embodiments, a mechanical coupler may enable +/−10 degrees of pitch between the robot and the accessory. In some embodiments, a mechanical coupler may enable +/−15 degrees of pitch between the robot and the accessory. As another example, constraining the accessory in yaw, lateral motion, and fore/aft motion may allow the robot to accurately estimate the footprint of the accessory, to better enable navigation in an environment with obstacles.

It should be appreciated that, in some embodiments, a mechanical coupler for an accessory may couple to a robot without displacing the accessory (or the robot) in a vertical direction. For example, referring to FIG. 4D, a mechanical coupler 420 of an accessory (not shown) may be coupled to a mechanical coupler 460 of a robot 450 without any motion along the Z axis. Rather, the mechanical coupler of the accessory may be displaced only along one or more horizontal directions (e.g., within the XY plane). In some embodiments, the mechanical coupler of the accessory may be displaced only along a single horizontal direction (e.g., along the X axis in FIG. 4D). In contrast to conventional coupling strategies that may require vertically displacing (e.g., lifting) one component to be coupled (e.g., a ball hitch mount), the mechanical coupler described herein may be coupled without any such intervention on the part of a user.

Figure 4E:
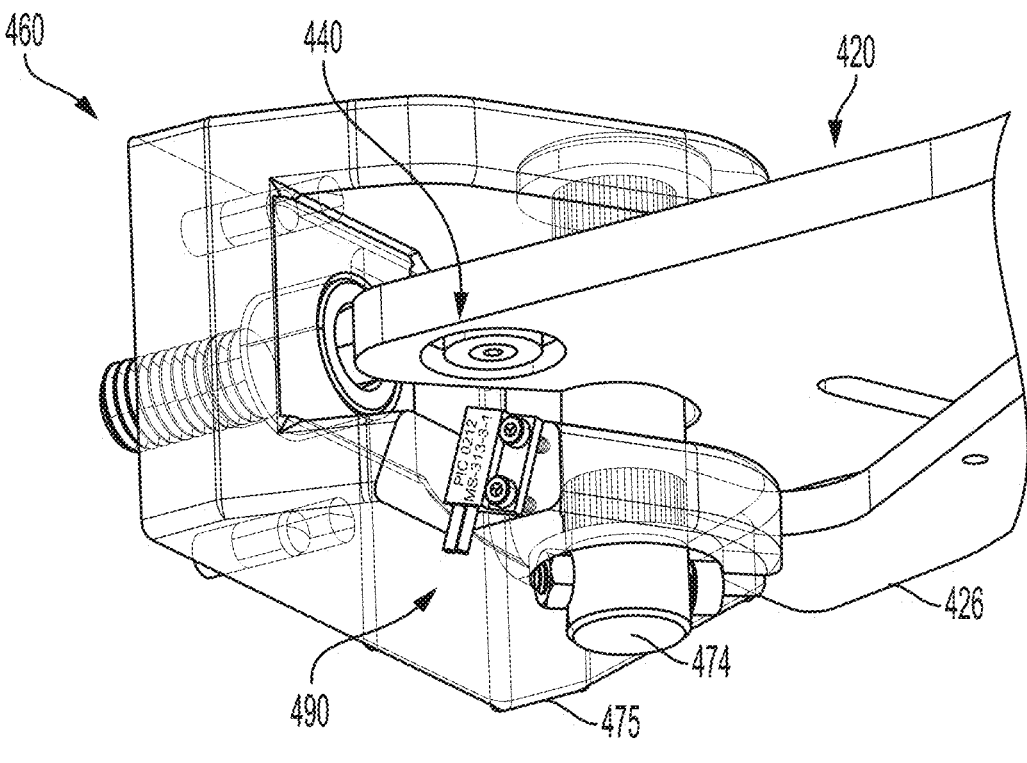
FIG. 4E depicts one embodiment of a coupling sensor.
Figure 4F:
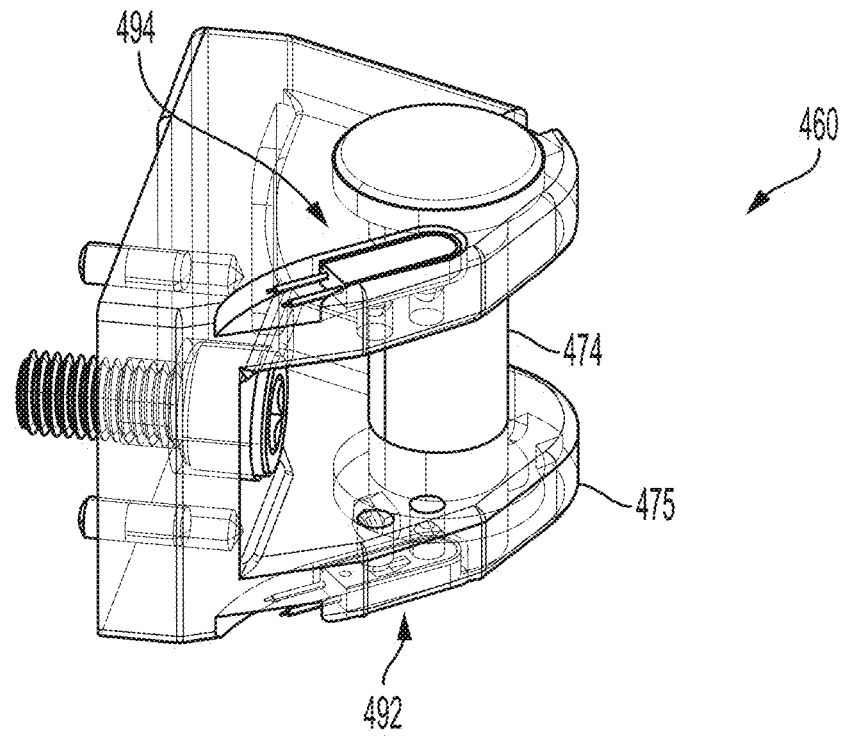
FIG. 4F depicts another embodiment of a coupling sensor.

As shown in FIGS. 4E and 4F, a mechanical coupler 460 of a robot 450 includes an exposed pin 474 secured by a body 475. The pin 474 is configured to be received in a receiving area 424a of a connector of a mechanical coupler 420 of the accessory. As described above in reference to FIG. 4C, a latch 426a is configured to secure the pin 474 in the receiving area 424a. While only a single pin is shown in FIGS. 4E and 4F, it should be appreciated that a mechanical coupler 460 of a robot 450 may include two pins, each of which is received by one of the two connectors of a mechanical coupler of an accessory (see, e.g., FIG. 4D).

In some embodiments, mechanical couplers on different accessories (e.g., cart accessories and conveyor accessories) may be similarly arranged, such that different accessories may couple to the same mechanical coupler of a robot. In some embodiments, different accessories may have different mechanical couplers, and a robot may have different mechanical couplers for different accessories.

For example, a robot may include a first mechanical coupler configured to receive a first accessory (e.g., a cart accessory), and a second mechanical coupler configured to receive a second accessory (e.g., a conveyor accessory). In some embodiments, the first and second mechanical couplers may be differently configured. For example, the first mechanical coupler may be incompatible with the second accessory such that the second accessory cannot couple to the robot through the first mechanical coupler. Similarly, the second mechanical coupler may be incompatible with the first accessory such that the first accessory cannot couple to the robot through the second mechanical coupler.

In some embodiments, mechanical couplers may be differently configured by including differently configured pins. For example, the two pins of a mechanical coupler of a robot may be differently sized (and the two receiving areas of a corresponding mechanical coupler of an accessory may similarly be differently sized to accommodate the differently sized pins). In some embodiments, a mechanical coupler of a robot may include a first pin with a first diameter and a second pin with a second diameter smaller than the first diameter.

In some embodiments, the diameters of the pins may be chosen to be standard diameters that are regularly available (e.g., ⅛ inch, ¼ inch, ⅜ inch, ½ inch, ⅝ inch, ¾ inch, ⅞ inch, 1 inch). Similarly, the material of the pins may be chosen to be standard materials that are regularly available (e.g., 1010 steel, 1018 steel, 1045 steel). Because the pins may be highly loaded and may be subject to appreciable friction from sliding contacts, the pins may wear at an appreciable rate. As such, choosing pins of standardized materials and/or diameters may enable easy repair and/or replacement.

Continuing the above example of a robot configured to connect to a cart accessory through a first mechanical coupler and a conveyor accessory through a second mechanical coupler, the first mechanical coupler may include the larger pin on the left side (when facing the robot from the point of view of the cart accessory), and the second mechanical coupler may include the larger pin on the right side (when facing the robot from the point of view of the conveyor accessory). To enable connections, the cart accessory may correspondingly include a mechanical coupler with a larger receiving area on the left side, while the conveyor accessory may correspondingly include a mechanical coupler with a larger receiving area on the right side. In this way, each of the cart accessory and the conveyor accessory may only be received by one of the two mechanical couplers of the robot.

In some embodiments, different accessory interfaces may be disposed on different sides of a robot. For example, a cart accessory interface may be disposed on a first side of a robot, and a conveyor accessory interface may be disposed on a second side of the robot, which may be opposite the first side. Such a configuration may be advantageous in consideration of other components of the robot. For example, it may be desirable to be able to charge the robot through a battery charging port while the robot is coupled to a cart accessory, but it may be less important to be able to charge the robot through the battery charging port while the robot is coupled to a conveyor accessory. Accordingly, the cart accessory interface may be disposed on a side of the robot that does not interfere with the battery charging port.

FIGS. 4E and 4F illustrate different embodiments of a coupling sensor. A coupling sensor may be configured to determine if a robot and an accessory are physically coupled through a mechanical interface of the robot. In some embodiments, the coupling sensor may be a magnetic sensor, such as a hall effect sensor or a reed switch. For example, FIG. 4E depicts a coupling sensor 490 disposed on a portion of a mechanical coupler 460 of a robot. The coupling sensor 490 is configured to sense the presence or absence of a magnet 440 disposed on a portion of a mechanical coupler 420 of an accessory. In some embodiments, a mechanical coupler of an accessory may include a single magnet (e.g., disposed on a single connector) configured to be sensed by a single magnetic sensor. In some embodiments, a single magnet may be configured to be sensed by one or both of a pair of magnetic sensors. For example, FIG. 4E shows a single sensor 490 disposed on a first side of a mechanical coupler 460 of a robot configured to sense a magnet 440 disposed on a mechanical coupler 420 of an accessory (e.g., from below the magnet). The mechanical coupler 460 of the robot may, in other embodiments, additionally include a second sensor disposed on a second side of the mechanical coupler 460 (e.g., opposite the first side) and may also be configured to sense the magnet 440 (e.g., from above the magnet). Additionally, it should be appreciated that while only one connector of a mechanical coupler 420 of an accessory is shown in FIG. 4E, the above-described arrangements may be included in one or both connectors of a mechanical coupler of an accessory. For example, a mechanical coupler of an accessory may include a magnet disposed on each connector (e.g., a first magnet disposed on connector 421a and a second magnet disposed on connector 421b in FIG. 4C). An associated mechanical coupler of a robot may include at least one first magnetic sensor configured to sense the first magnet and at least one second magnetic sensor configured to sense the second magnet.

In some embodiments, a coupling sensor may be a contactless sensor. A contactless sensor may include any of the magnetic sensors described above or other sensor configurations. For example, a contactless sensor may include an emitter/receiver pair. FIG. 4F shows one embodiment of a coupling sensor that includes an emitter 492 configured to emit energy (e.g., an IR beam) and a receiver 494 configured to receive the energy emitted by the emitter 492. When the mechanical coupler 420 of an accessory is coupled to the mechanical coupler 460 of a robot, the energy emitted from the emitter is blocked from reaching the receiver, thereby providing a signal indicative of coupling. It should be appreciated that other types of coupling sensors are contemplated, and the present disclosure is not limited to magnetic and/or contactless coupling sensors.

Figure 5A:
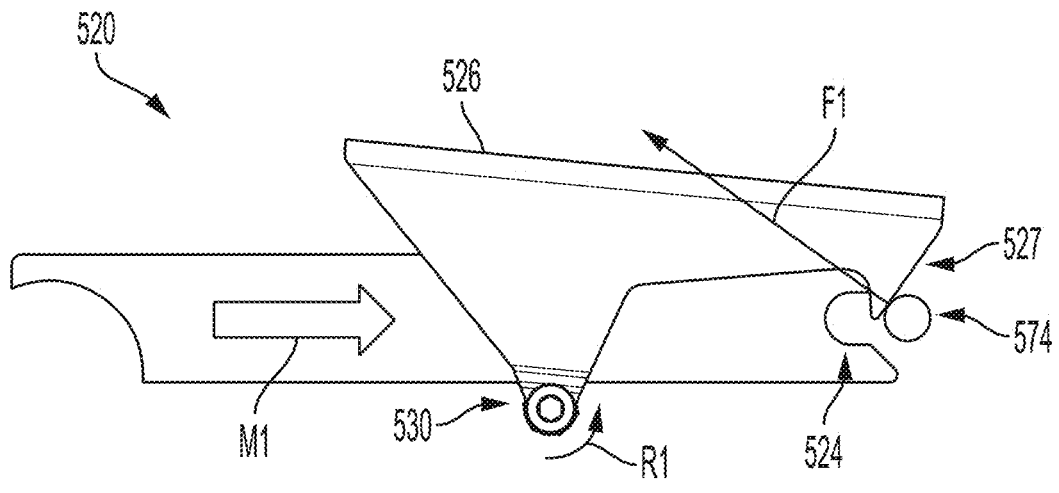
FIG. 5A depicts one embodiment of a mechanical coupler of an accessory during coupling.
Figure 5B:
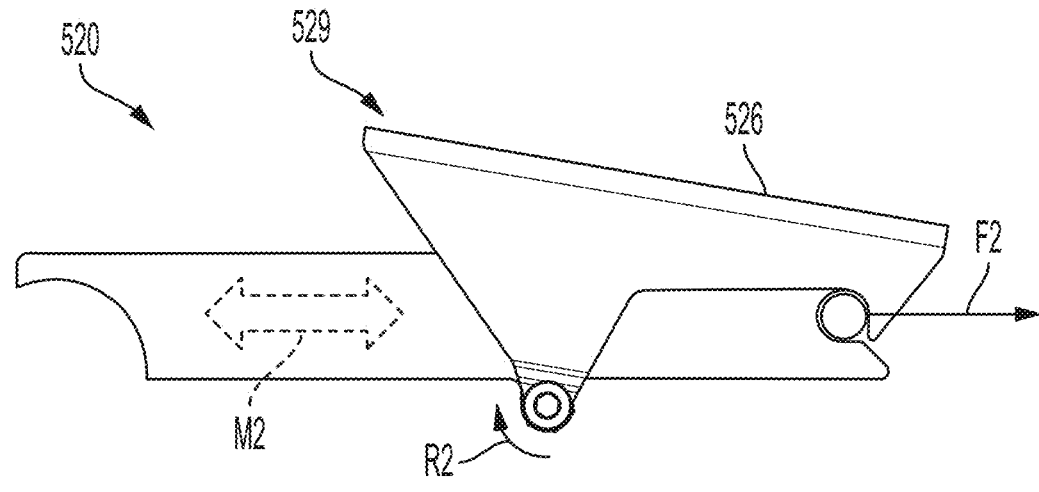
FIG. 5B depicts the mechanical coupler of FIG. 5A after coupling.
Figure 5C:
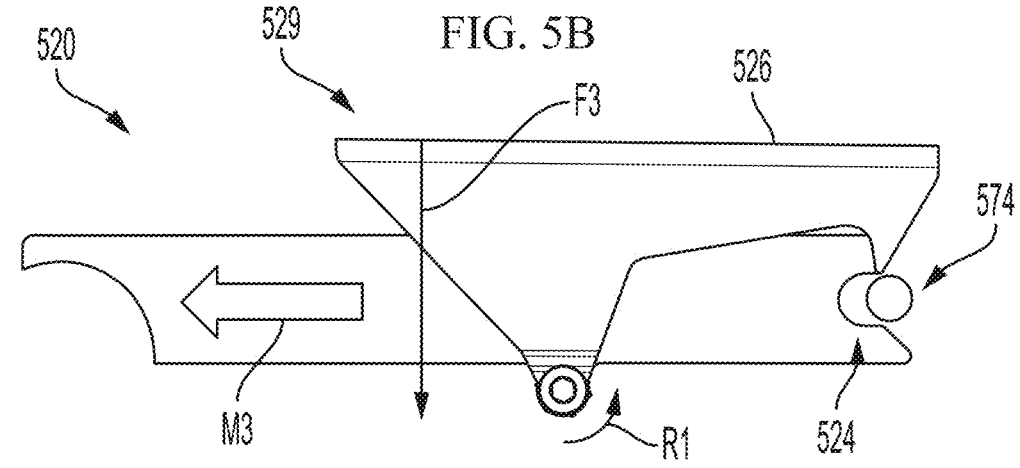
FIG. 5C depicts the mechanical coupler of FIG. 5A during uncoupling.

FIGS. 5A-5C depict one embodiment of a portion of a mechanical coupler 520 of an accessory interacting with a corresponding mechanical coupler of a robot (of which only pin 574 is shown for clarity). As a latch 526 of the mechanical coupler 520 is displaced toward the pin 574 (as indicated by arrow M1 in FIG. 5A), a protrusion 527 of the latch 526 contacts the pin 574. The reaction force F1 exerted on the latch 526 causes the latch to rotate about a joint 530 in a first direction R1, moving the protrusion 527 away from a receiving area 524. With the protrusion 527 of the latch 526 no longer blocking an opening of the receiving area 524 of the mechanical coupler 520, further displacement of the latch 526 toward the pin 574 allows the pin 574 to be received within the receiving area 524.

When the pin 574 is fully received within the receiving area 524, the latch 526 rotates back (e.g., due to a restoring torque from a spring, not shown) to secure the pin 574 in the receiving area 524, as shown in FIG. 5B. When the pin 574 is within the receiving area 524 and exerts a force F2 on the latch 526 (e.g., as the robot moves forward, towing the accessory), the latch 526 is configured to further rotate in a closing direction R2, further securing the pin 574 within the receiving area 524. In this way, the pin 574 is constrained from moving within the receiving area 524, as indicated by the dashed arrow M2 in FIG. 5B.

Referring to FIG. 5C, when a force F3 is applied to a handle 529 of the latch 526, the latch 526 opens by again rotating in the first direction R1. In doing so, the protrusion 527 of the latch 526 no longer blocks the opening of the receiving area 524, such that motion of the mechanical coupler 520 in a direction away from the pin 574 (as indicated by arrow M3) is not impeded, and the accessory may be decoupled from the robot.

Figure 6:
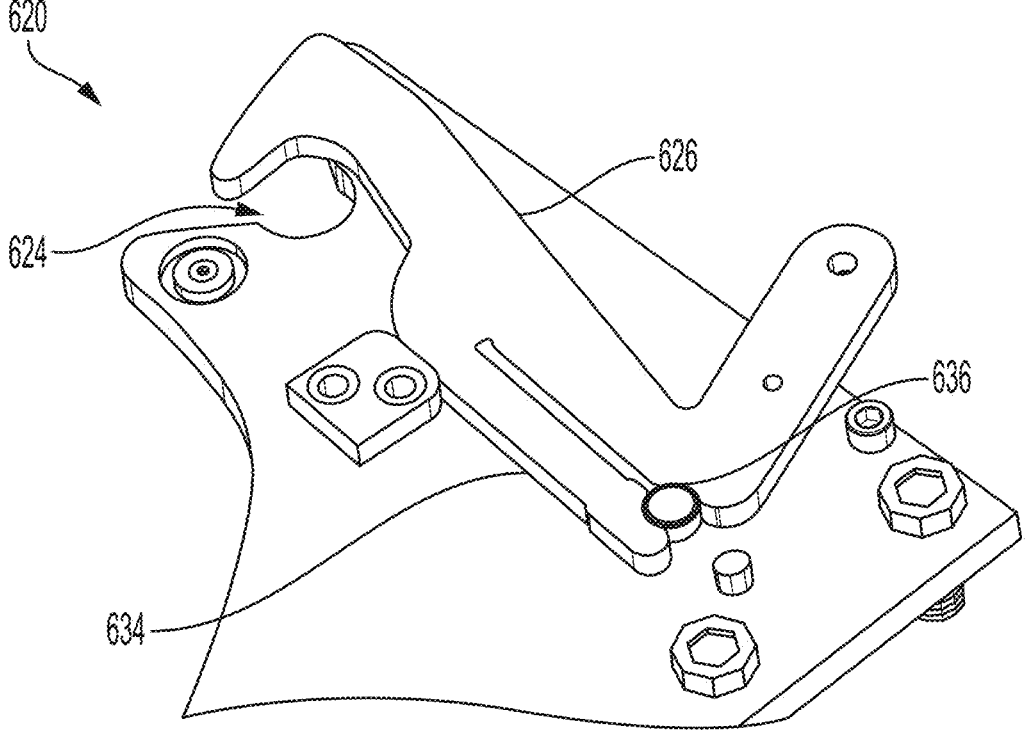
FIG. 6 depicts one embodiment of a mechanical coupler with a mechanical fuse.

In some embodiments, a mechanical coupler for an accessory may include one or more mechanical fuses. FIG. 6 depicts a mechanical coupler 620 with two mechanical fuses. A first mechanical fuse includes a flexure 634 on a latch 626. Normally, when a pin is received in receiving area 624 and exerts a force on the latch 626, the latch may close further (as described above in relation to FIG. 5B). However, if the pin exerts a force on the latch 626 above a first threshold, the flexure 634 may be deformed sufficiently to release the pin. In some embodiments, the flexure may be deformed elastically. In some embodiments, the flexure may be deformed plastically. In this way, a first mechanical fuse may include deformation of the flexure 634 upon exceeding a first threshold force. If the force exerted by the pin on the latch 626 is further increased above a second threshold, a break-off pin 636 may fail (e.g., break), opening the latch. In this way, a second mechanical fuse may include breaking the break-off pin 636 upon exceeding a second threshold force.

It should be appreciated that although the first and second mechanical fuses are described above as functioning together, some embodiments of a mechanical coupler for an accessory may include only one mechanical fuse. For example, a load may cause a mechanical fuse that includes a flexure to elastically deform the flexure, thereby releasing a pin of a connector. At this point, the load path between the robot and the accessory is opened and forces may no longer be transferred. In this case, no components may have been broken and therefore the system may be reset. As another example, if a load on a mechanical fuse that includes a break-off pin exceeds a threshold, the mechanical fuse may break to open the load path between the robot and the accessory. At this point, forces may no longer be transferred between the robot and the accessory. In this case, one or more components have been broken and therefore the system may need one or more replacement components before being reset.

In some embodiments, the robot may be able to detect when one or more mechanical fuses has surpassed its associated threshold. Determining that one or more mechanical fuses has surpassed its associated threshold may be indicative that the accessory is no longer securely attached to the robot, and may trigger a corrective action to be taken (e.g., by the robot, or by a user).

Figure 7A:
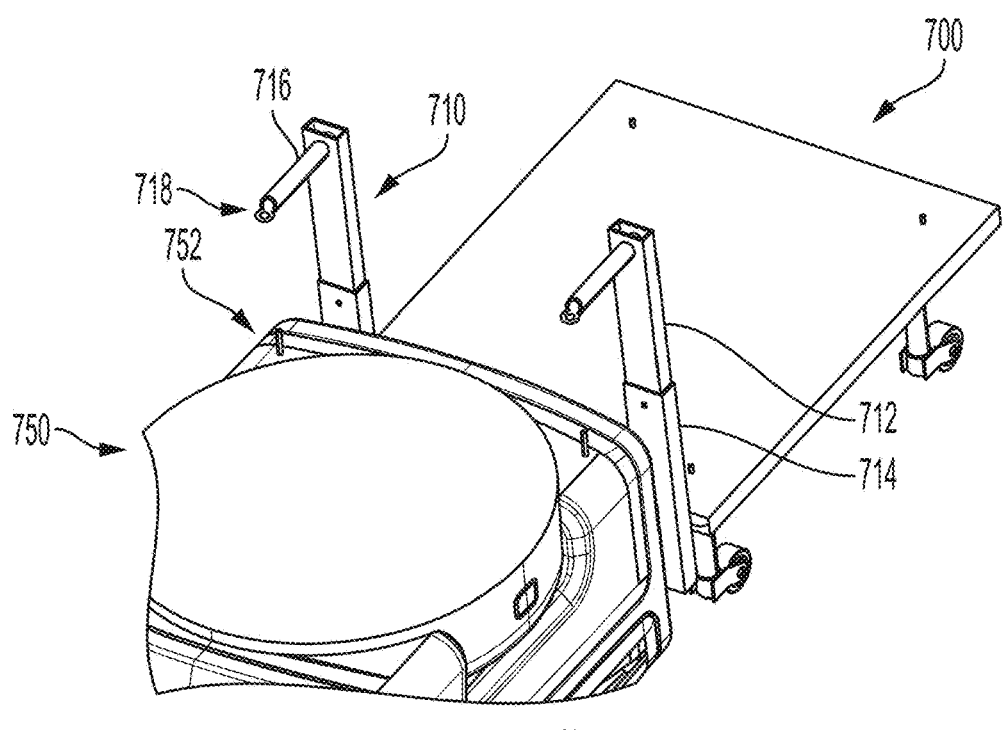
FIG. 7A depicts another embodiment of a mechanical coupler of an accessory.
Figure 7B:
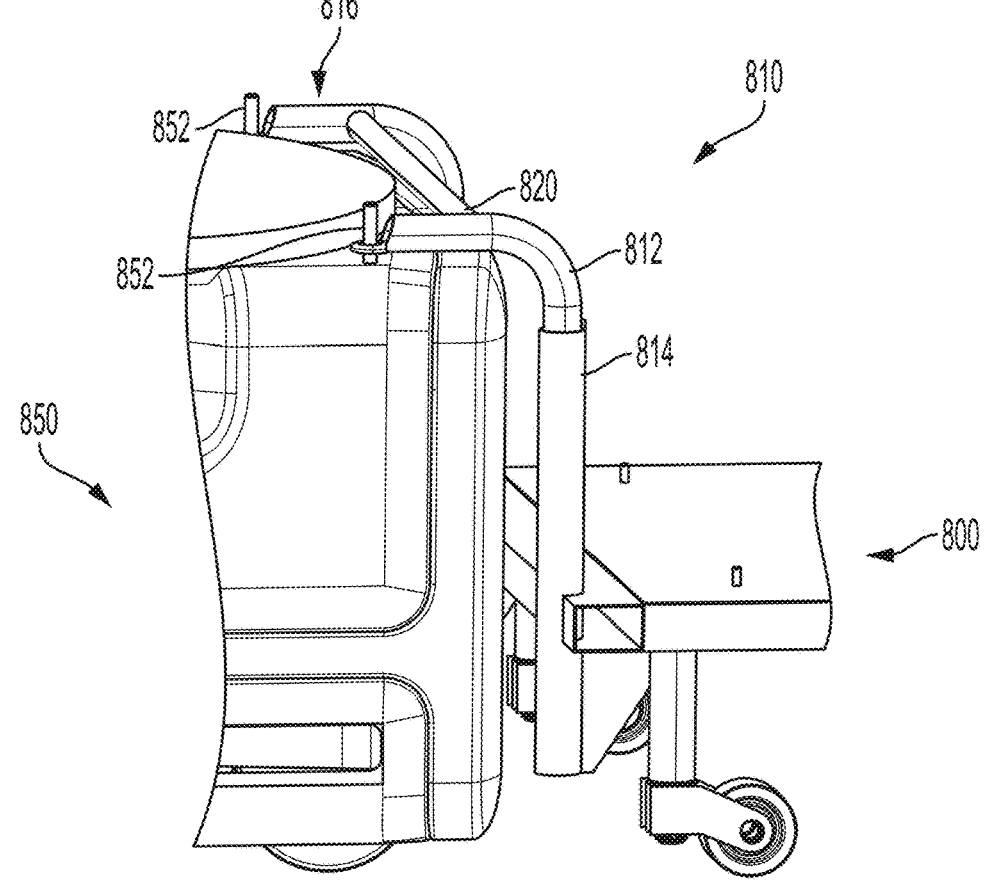
FIG. 7B depicts another embodiment of a mechanical coupler of an accessory.

FIGS. 7A-7B depict alternative embodiments of a mechanical coupler of an accessory. In FIG. 7A, an accessory 700 includes a mechanical coupler 710. The mechanical coupler 710 includes two connectors. Each connector includes a telescoping support in which a first member 712 translates relative to a second member 714. When the first member 712 is extended, a handle 716 may be at an appropriate height to be comfortably manipulated by a user to push the accessory 700. When the first member 712 is retracted, a receiving area 718 on the handle may receive a pin 752 on the robot 750. In the embodiment of FIG. 7A, the first and second members 712 and 714 include rectangular cross-sections. In the embodiment of FIG. 7B, first and second members 812 and 814 include circular cross-sections. To prevent rotation of the first member 812 relative to second member 814 about a shared axis, a crossbar 820 couples to the first members on either side of the mechanical coupler 810 of the accessory 800. Similar to the embodiment of FIG. 7A, the mechanical coupler 810 of FIG. 7B includes handles 816 with receiving areas (not labeled, for clarity) configured to receive pins 852 of a robot 850.

Figure 8:
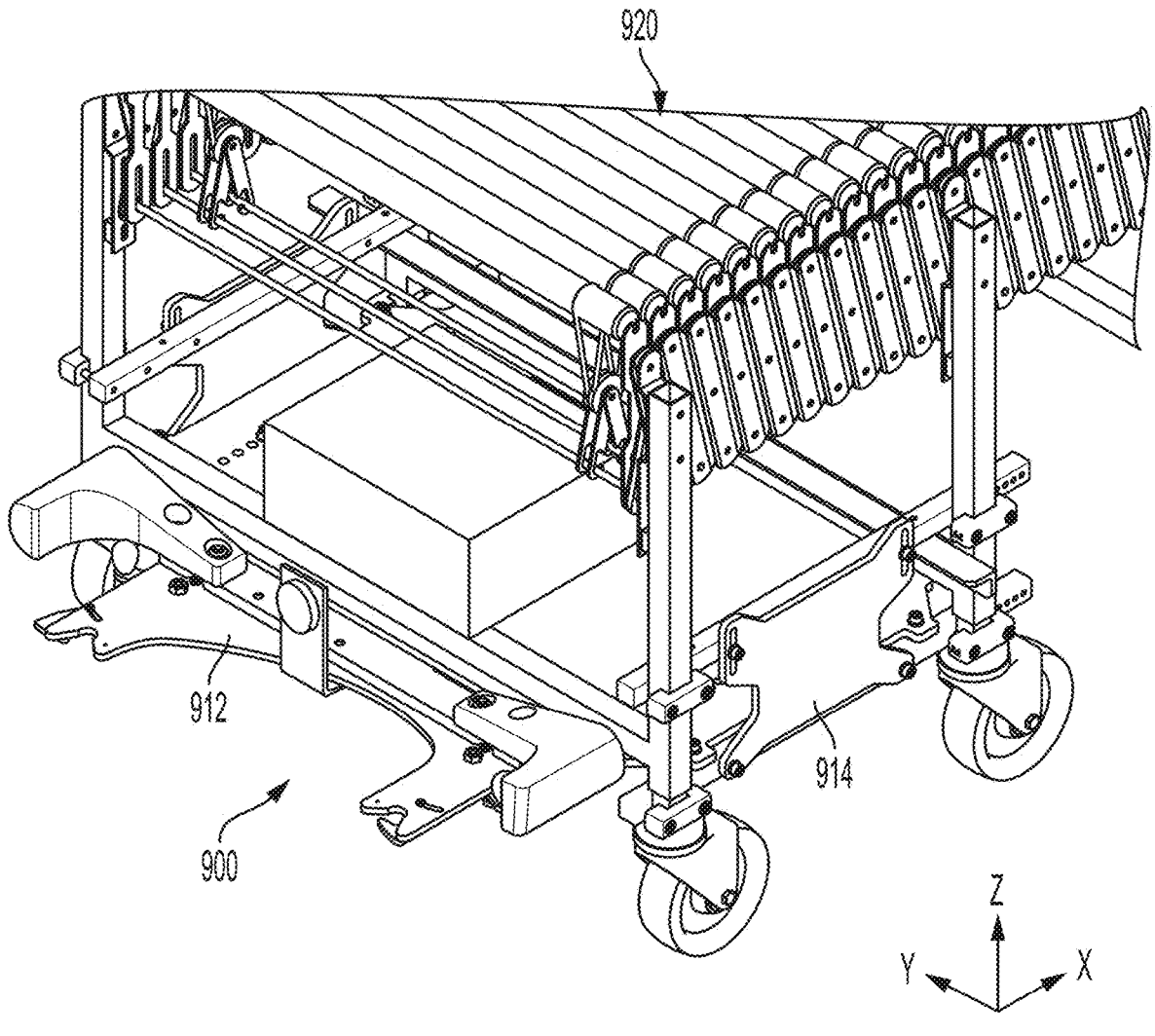
FIG. 8 depicts one embodiment of a kit that includes a mechanical coupler and a brace configured to couple to a conveyor accessory.

In some embodiments, a mechanical coupler designed in accordance with the techniques described herein is included as a portion of a kit. The kit may be configured to couple to an accessory such as a conveyor accessory. FIG. 8 illustrates an example of a kit 900 that includes a mechanical coupler 912 and a brace 914 coupled to the mechanical coupler 912. As shown in FIG. 8, brace 914 may be configured to couple to conveyor accessory 920. In the example shown in FIG. 8, conveyor accessory 920 includes a plurality of rollers on which an object (e.g., a box) may be placed and a plurality of legs coupled to the plurality of rollers. Conveyor accessory 920 may be expandable in the X-direction (along the length of the conveyor) to enable the conveyor to be extended. As the conveyor accessory 920 is expanded in the X-direction, a spacing between the rollers increases such that gaps form between adjacent rollers. The inventors have recognized and appreciated that it may be advantageous in some implementations to reduce the size of gaps between the rollers of a conveyor accessory near the position of the conveyor accessory where objects will be placed. Reducing the gaps between rollers of a conveyor accessory may make it less likely that an object becomes wedged between the rollers when an object is first placed on the conveyor accessory.

Brace 914 may be configured to couple between adjacent legs of the conveyor accessory 920 and may be adjustable such that the spacing between the adjacent legs of the conveyor accessory 920 may be fixed at a desired distance. For instance, if the gap between rollers is to be minimized, the adjacent legs of the conveyor accessory may located as close as possible to each other in the X-direction, and the brace 914 may be adjusted to maintain this fixed minimum distance between the legs.

In some embodiments, brace 914 is implemented as a universal connector that enables the kit 900 including brace 914 and mechanical coupler 912 to be coupled to the legs of any or most commercially-available conveyor accessories, thereby enabling coupling between a wide range of conveyor accessories and a robotic device that includes a matching mechanical coupler as described herein. Such implementations allow for utilization of existing rollers, legs and wheels of the conveyor accessory for mobility of the convey accessory when coupled to the robotic device. In some embodiments, in addition to the mechanical coupler 912 and brace 914, the kit 900 may also include other components such as a radio frequency (RF) identifier tag, which enables the mechanical coupler 912 and/or the coupled conveyor accessory to be identified by an RF tag reader.

Control of one or more of the robotic arm, the mobile base, the turntable, and the perception mast may be accomplished using one or more computing devices located on-board the mobile manipulator robot. For instance, one or more computing devices may be located within a portion of the mobile base with connections extending between the one or more computing devices and components of the robot that provide sensing capabilities and components of the robot to be controlled. In some embodiments, the one or more computing devices may be coupled to dedicated hardware configured to send control signals to particular components of the robot to effectuate operation of the various robot systems. In some embodiments, the mobile manipulator robot may include a dedicated safety-rated computing device configured to integrate with safety systems that ensure safe operation of the robot.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A mechanical coupler for coupling a robot and an accessory, the mechanical coupler comprising:

a first connector comprising:

a first receiving area configured to receive a first pin of the robot through a first opening, the first receiving area having at least one first dimension;

a first moveable latch configured to constrain motion of the first pin when the first pin is received within the first receiving area and when a first protrusion of the first moveable latch is disposed in the first opening;

a first mechanical fuse including a flexure configured to enable motion of the first moveable latch to release the first pin at a first load; and a second mechanical fuse including a break-off pin configured to break at a second load greater than the first load; and a second connector comprising:

a second receiving area configured to receive a second pin of the robot through a second opening, the second receiving area having at least one second dimension different from the at least one first dimension; and a second moveable latch configured to constrain motion of the second pin when the second pin is received within the second receiving area and when a second protrusion of the second moveable latch is disposed in the second opening, wherein the mechanical coupler is configured to constrain rotation between the accessory and the robot about a first axis and to constrain translation between the accessory and the robot along second and third axes, wherein the second and third axes are each perpendicular to the first axis, and wherein the third axis is perpendicular to the second axis.

2. The mechanical coupler of claim 1, wherein:

the first receiving area includes a round hole; and the second receiving area includes a linear slot.

3. The mechanical coupler of claim 1, wherein the mechanical coupler is configured to enable translation between the accessory and the robot along the first axis and is configured to enable rotation between the accessory and the robot about the second and third axes.

4. The mechanical coupler of claim 3, wherein:

the mechanical coupler is configured to enable rotation between the accessory and the robot about the second axis of greater than or equal to −15 degrees and less than or equal to 15 degrees, and the mechanical coupler is configured to enable rotation between the accessory and the robot about the third axis of greater than or equal to −15 degrees and less than or equal to 15 degrees.

5. The mechanical coupler of claim 1, further comprising:

a first torsional spring configured to rotate the first moveable latch relative to the first receiving area in a first direction; and a second torsional spring configured to rotate the second moveable latch relative to the second receiving area in a second direction.

6. The mechanical coupler of claim 5, wherein:

the first moveable latch includes a first handle configured to enable rotation of the first moveable latch in a third direction opposite the first direction; and the second moveable latch includes a second handle configured to enable rotation of the second moveable latch in a fourth direction opposite the second direction.

7. The mechanical coupler of claim 1, further comprising a detectable component configured to be detected when the robot and the accessory are coupled.

8. The mechanical coupler of claim 7, wherein the detectable component includes a magnet configured to be detected by a magnetic sensor on the robot.

9. A cart accessory comprising:

a cart body having a flat surface on which one or more objects can be placed;

a plurality of wheels coupled to the cart body; and the mechanical coupler of claim 1.

10. A kit, comprising:

an adjustable brace configured to couple to an expandable accessory and constrain expansion of at least a portion of the expandable accessory in a length direction of the expandable accessory; and the mechanical coupler of claim 1 coupled to the adjustable brace.

\* \* \* \* \*